United States Patent

[11] 3,564,159

[72] Inventor Berthold Kussner
Berlin, Germany

[21] Appl. No. 756,968
[22] Filed Sept. 3, 1968
[45] Patented Feb. 16, 1971
[73] Assignee Telefunken Palenlverwerlungsgesellschaft m.b.h.
Ulm, Danube, Germany
[32] Priority Sept. 2, 1967
[33] Germany
[31] P 15 72 527.6

[54] MAGNETIC HEAD FOR USE WITH GROOVE-TYPE RECORDING CARRIERS
7 Claims, 3 Drawing Figs.

[52] U.S. Cl. .......... 179/100.2, 179/100.41
[51] Int. Cl. .......... G11b 5/26, G11b 21/06
[50] Field of Search .......... 179/100.41 (C), 100.2 (C), 100.2 (A); 274/4.1, 4.2, 41.4

[56] References Cited

UNITED STATES PATENTS

| | | | |
|---|---|---|---|
| 2,633,504 | 3/1953 | Beer | 179/100.2 |
| 2,590,292 | 3/1952 | Anderson | 179/100.2 |
| 2,361,753 | 10/1944 | Eilenberger | 179/100.2 |

FOREIGN PATENTS

| | | | |
|---|---|---|---|
| 776,348 | 6/1957 | Great Britain | 346/74 |

*Primary Examiner*—J. Russel Goudeau
*Attorney*—Spencer & Kaye

ABSTRACT: A magnetic head for use with a recording device of the type employing a grooved recording carrier and arranged to experience reduced wear by being provided, at its lower end which contacts the recording carrier groove, with a contact element made of a hard material and disposed in a blind hole formed in the lower end of the head, the lower end of the head being formed so as to be flush with the exposed end of the contact element and so as to have a width which is approximately equal to the diameter of the contact element.

INVENTOR
Berthold Küssner
BY Spencer & Kaye
ATTORNEYS

MAGNETIC HEAD FOR USE WITH GROOVE-TYPE RECORDING CARRIERS

BACKGROUND OF THE INVENTION

The present invention relates to magnetic heads for use with a grooved recording carrier, and particularly to heads of this type which are constructed to experience a minimum of wear.

Dictating machines are known which have a magnetic head of the combined type in which the magnetic core consists of three members connected by a common yoke, the erasing gap being provided between one outer member and the center member and the listen/record gap being disposed between the other outer member and the center member. This type of construction is suitable in dictating machines because the two operating gaps can thus be arranged in close proximity so that accurate correction of dictating errors, down to individual syllables, is facilitated.

In dictating machines which operate with a grooved recording carrier, where the useful signal is recorded in the bottom of a trapezoidal groove, the width of the magnetic head pole pieces is of necessity only a fraction of a millimeter. It is therefore particularly annoying when the side surfaces of the pole pieces of these heads wear out, due to unavoidable friction with the groove walls, after a certain period of machine operation. This wear is undesirable because it reduces the width of the contact surface between the groove bottom and the head and increases the amount of play which the head experiences in the groove. Consequently variations in volume occur during playback, and these variations are of a constantly increasing magnitude, since the recording track and the playback track are no longer coextensive at every point. It is therefore necessary to quite often replace the magnetic head unless steps to prevent wear of the magnetic head are taken.

In order to keep this wear at a minimum, it is known to dispose a guide element, whose dimensions are adapted to the groove profile, on a leaf spring fastened to the magnetic head. This guide element serves to cause the pole pieces of the magnetic head to move in the center of the recording carrier groove. This solution requires the expenditure for a separate component which must be fastened to the magnetic head and which must be adjusted. Since this arrangement is such that the guide element and the pole pieces are spaced apart by several groove widths, the apparatus can not be used when the recording carrier has a starting or stopping groove presenting an increased inclination. Moreover, this spacing between the guide element and the pole pieces makes it impossible to completely utilize the recording carrier capacity.

SUMMARY OF THE INVENTION

It is a primary object of the present invention to overcome these drawbacks and difficulties.

Another object of the invention is to simplify the construction of wear-resistant magnetic heads for use with grooved recording carriers.

Still another object of the invention is to provide a structurally simple magnetic head which is subjected to a minimum of wear.

Yet a further object of the invention is to assure that such a magnetic head will always remain centered with respect to the groove in such a recording carrier.

The present invention effects a reduction in the wear on the pole pieces while avoiding the above drawbacks. This is achieved by certain novel improvements in a magnetic head unit for use with a magnetic sound instrument operating with a grooved recording carrier, which unit includes a head composed of a center member and two outer members each disposed to a respective side of the center member to form pole pieces, the members together defining an end surface which is to contact the bottom of the recording carrier groove, the unit further including a guide element made of a hard material and arranged to maintain the magnetic pole pieces centered in the groove. According to the improvements of the invention, the guide element is constituted by a cylindrical stylus whose diameter is approximately equal to the width of the recording carrier groove bottom, the center member is provided with a blind hole extending from the end surface in a direction transverse to such surface, the stylus is permanently fastened in the hole, and the head is formed so that the end surface defined by the members and the lower ends of the lateral member surfaces directly adjacent the end surface substantially coincide with the exposed end of the stylus.

The present invention thus represents a radical departure from the heretofore fore widely accepted idea that a guide element provided in such a thin magnetic head would have an adverse influence on the magnetic characteristics thereof and that such a guide element could not be satisfactorily mounted in the head. It has been discovered in practice that embodiments of the present invention do not degrade the performance of the magnetic head and that the guide element can be sufficiently securely mounted in the center member of the head to permit the lower ends of the members defining the pole pieces to be subsequently machined to give them the desired configuration.

Moreover, the guide element can be made to remain securely fastened in the center member, even after a long period of operation, primarily because the guide element can be made sufficiently long and can be manufactured in such a way that it will be exposed only at its extreme lower end.

Furthermore, in contrast with the results produced by known arrangements of a guide element with a magnetic head, embodiments of the present invention also serve to protect the surface of the magnetic head which contacts the recording carrier groove against wear and also serves to similarly protect the lateral surfaces of the pole pieces defined by the magnetic head member.

The present invention eliminates the need for a separate, adjustable guide element and enables the magnetic head to be guided by the very groove in which the pole pieces are disposed.

DESCRIPTION OF THE PREFERRED EMBODIMENTS

Figures 1, 2, 3:
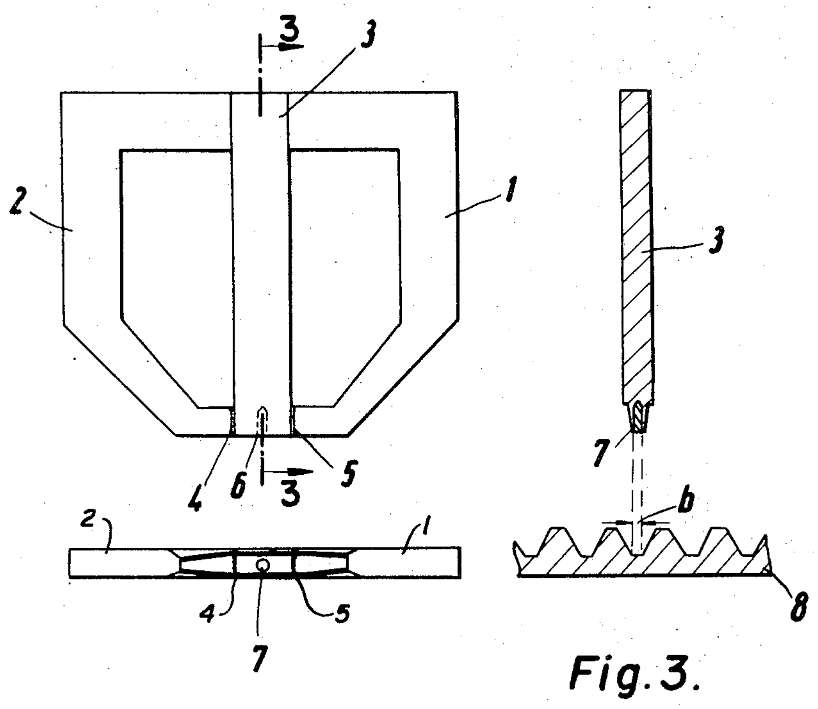
FIG. 1 is an elevational view of one embodiment of the present invention.
FIG. 2 is a bottom plan view of the element of FIG. 1.
FIG. 3 is a cross-sectional view along the line 3–3 of FIG. 1.

In FIGS. 1 and 2 of the drawings, t a three-member magnetic head, consisting of the two outer members 1 and 2 and the common center member 3, is schematically represented, the various inductor windings provided on the members not being shown. The erase gap 4 is disposed between the outer member 2 and the center member 3 and the playback/record gap 5 is disposed between the outer member 1 and the center member 3.

The thickness of the pole pieces forming the operating gaps 4 and 5 is initially greater than the width $b$ (FIG. 3) of the bottom of a groove of a recording carrier 8 with which the head is to be used so that a blind hole 6 can be drilled from the bottom into the center member, which hole has a diameter approximately corresponding to the width of the groove bottom. The hole 6 is hidden in the view of FIG. 1 and for this reason is shown therein by a broken line. The surface into which the hole is drilled is visible in FIG. 2.

A cylindrical sapphire stylus is inserted into this blind hole and is cemented therein. Then, after the magnetic head has been completely assembled, the pole pieces can be machined in a known manner to have the bevel shape shown in FIG. 3. The bottom surface of the pole pieces will then be dimensioned so that, upon completion of the machining operation, its greatest width, which will be at the center of member 3, will correspond approximately to the diameter of the sapphire stylus 7 whose lower end is flush with the groove-contacting surface.

The machining is, however, performed so as to give the lower end of the head a hemispherical or tapered cross section, as shown in FIG. 3, so that the sapphire stylus 7 will be exposed only at the very bottom of the lateral surfaces of the pole pieces, thus preventing unnecessary stress from being applied to its mounting within the blind hole even during operation.

In the illustrated embodiment, the dimensions of the magnetic head are somewhat exaggerated for illustrative purposes. In a practical embodiment of a magnetic head according to the invention the diameter of the blind hole 6 is only 0.3 mm and is depth is approximately 1 mm.

It will be understood that the above description of the present invention is susceptible to various modifications, changes and adaptations.

I claim:

1. In a magnetic head unit for use with a magnetic sound instrument operating with a grooved recording carrier, which unit includes a head composed of a center member and two outer members each disposed to a respective side of the center member to form pole pieces, the outer members being separated from the center member by respective air gaps and the members being of magnetic material and together defining an end surface which is to contact the bottom of the recording carrier groove, the unit further including a guide element made of a hard material and arranged to maintain the magnetic head pole pieces centered in the groove, the improvement wherein said guide element is constituted by a cylindrical stylus whose diameter is approximately equal to the width of the recording carrier groove bottom and whose length is substantially greater than its diameter, said center member is provided with a blind hole disposed midway between, and spaced from, said air gaps and extending from said end surface in a direction transverse to such surface, said stylus is permanently fastened in said hole, and said head is formed so that said end surface defined by said members and the lower ends of the lateral member surfaces directly adjacent said end surface substantially coincide with the exposed end of said stylus.

2. An arrangement as defined in claim 1 wherein the portion of said unit adjacent said end surface is tapered toward said end surface to give said end surface a maximum width which is approximately equal to the diameter of said stylus.

3. An arrangement as defined in claim 2 wherein the width of said end surface decreases progressively from the region of said blind hole toward both of said outer members.

4. An arrangement as defined in claim 1 wherein said outer members and said center member are disposed in a line parallel to the direction of travel of said head relative to the recording carrier groove.

5. An arrangement as defined in claim 1 wherein the exposed end of said stylus is flush with said end surface.

6. An arrangement as defined in claim 1 wherein said stylus is made of sapphire.

7. An arrangement as defined in claim 1 wherein the surfaces of said members defining the boundaries of each said air gap are oriented substantially parallel to one another.

UNITED STATES PATENT OFFICE
CERTIFICATE OF CORRECTION

Patent No. 3,564,159 Dated February 16th, 1971

Inventor(s) Berthold Küssner

It is certified that error appears in the above-identified patent and that said Letters Patent are hereby corrected as shown below:

In the heading of the patent, line 6, change "Palenlverwerlungsgesellschaft" to --Patentverwertungsgesellschaft--. Column 2, line 10, after "heretofore" delete "fore"; line 34, change "member to --members--.

Signed and sealed this 17th day of August 1971.

(SEAL)
Attest:

EDWARD M.FLETCHER,JR.
Attesting Officer

WILLIAM E. SCHUYLER, JR.
Commissioner of Patents